United States Patent
Luna et al.

(10) Patent No.: US 8,024,846 B2
(45) Date of Patent: Sep. 27, 2011

(54) PREPARATION OF AN ARTICLE SURFACE HAVING A SURFACE COMPRESSIVE TEXTURE

(75) Inventors: Alberto Luna, Cincinnati, OH (US);
Jeffrey F. Wessels, Cincinnati, OH (US);
Dale R. Lombardo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1284 days.

(21) Appl. No.: 11/340,908

(22) Filed: Jan. 27, 2006

(65) Prior Publication Data

US 2007/0175030 A1    Aug. 2, 2007

(51) Int. Cl.
*B21C 37/30* (2006.01)
*B24B 39/00* (2006.01)

(52) U.S. Cl. .......................... 29/90.7; 29/90.5

(58) Field of Classification Search ............. 29/90.01, 29/90.3, 90.5, 90.7
See application file for complete search history.

(56) References Cited

U.S. PATENT DOCUMENTS

| | | | |
|---|---|---|---|
| 3,073,022 A * | 1/1963 | Bush et al. | 72/53 |
| 4,063,346 A | 12/1977 | Simpson et al. | |
| 4,428,213 A * | 1/1984 | Neal et al. | 72/53 |
| 4,922,739 A | 5/1990 | Ostertag | |
| 4,947,668 A | 8/1990 | Ostertag | |
| 5,313,700 A * | 5/1994 | Dorman | 29/889.7 |
| 5,664,658 A * | 9/1997 | Luo et al. | 194/244 |
| 5,664,991 A | 9/1997 | Barton, II | |
| 5,722,165 A * | 3/1998 | Kobayashi et al. | 29/894.325 |
| 5,826,453 A | 10/1998 | Prevey, III | |
| 5,863,239 A | 1/1999 | Barton, II | |
| 6,415,486 B1 | 7/2002 | Prevey, III | |
| 6,465,040 B2 * | 10/2002 | Gupta et al. | 427/142 |
| 6,622,570 B1 | 9/2003 | Prevey, III | |
| 6,755,065 B2 | 6/2004 | Ostertag | |
| 6,796,533 B2 | 9/2004 | Barrett et al. | |
| 7,364,803 B1 * | 4/2008 | Anderson | 428/687 |
| 2002/0174528 A1 * | 11/2002 | Prevey, III | 29/90.01 |
| 2004/0166776 A1 | 8/2004 | Kondo et al. | |
| 2004/0240762 A1 | 12/2004 | Cadle et al. | |
| 2005/0067413 A1 | 3/2005 | Morris | |
| 2005/0155203 A1 | 7/2005 | Prevey | |
| 2006/0277753 A1 * | 12/2006 | Ntsama-Etoundi et al. | 29/889.1 |

FOREIGN PATENT DOCUMENTS

| | | |
|---|---|---|
| EP | 1555329 A1 | 7/2005 |
| EP | 1607169 A1 | 12/2005 |
| WO | 2005121387 A1 | 12/2005 |

OTHER PUBLICATIONS

European Search Report mailed Jun. 16, 2007.

* cited by examiner

*Primary Examiner* — David Bryant
*Assistant Examiner* — Christopher Koehler
(74) *Attorney, Agent, or Firm* — McNees Wallace & Nurick LLC

(57) ABSTRACT

A method for preparing a surface includes providing an article having an article surface, thereafter first processing the article surface to establish a first residual compressive stress state and a first surface roughness in the article surface, and thereafter second processing the article surface by surface compressive texturing to establish a second residual compressive stress state and a second surface roughness in the article surface. The second surface roughness is quantitatively less than the first surface roughness, and substantially no material is removed from the article surface in the step of second processing.

13 Claims, 3 Drawing Sheets

PREPARATION OF AN ARTICLE SURFACE HAVING A SURFACE COMPRESSIVE TEXTURE

This invention relates to the preparation of the surface of an article, and more particularly to producing a beneficial surface texture and residual stress state in the article surface.

BACKGROUND OF THE INVENTION

The surface state of an article often has an important effect on the performance of the article. For example, corrosion and oxidation damage resulting from exposure to an adverse environment are largely controlled by the character of the surface of the article. A protective layer may in some circumstances be applied to the surface of the article to improve its corrosion and oxidation resistance.

In another example, the fatigue resistance of an article, which is subjected to fatigue loading in service, is improved if the surface of the article is in a residual compressive stress state. The residual compressive stress state suppresses the initiation and propagation of fatigue cracks that would otherwise start at the surface and propagate into the interior of the material. Techniques for producing a compressive stress state at the surface are known.

However, such techniques for producing a residual compressive stress state at the surface may modify other properties of the surface, such as its smoothness, and consequently interfere with the ultimate performance of the article in its intended application. An airfoil whose surface is mechanically worked to produce a residual compressive state at the surface, thereby improving the airfoil's fatigue performance, may have its surface finish disrupted to such a degree that the aerodynamic performance of the airfoil is degraded. The known approaches for improving the surface finish in turn adversely affect the residual compressive stress state. Consequently, achieving both a desirable residual compressive stress state and the necessary high-quality surface finish has not been possible using existing techniques.

There is a need for an improved approach to the surface processing of airfoils and other shapes that achieves both the desired mechanical residual compressive stress state and the desired low-roughness surface finish. The present invention fulfills this need, and further provides related advantages.

SUMMARY OF THE INVENTION

The present invention provides a method for preparing a surface of an article. The surface has a residual compressive stress that is desirable for delaying the onset of fatigue cracking. The surface also has a smooth surface finish with a surface texturing that has a quantitatively low surface roughness. Optionally, the surface texturing may have a directionally oriented surface texture pattern of the surface asperities (i.e., bumps or ridges). Such a directionally oriented surface texture pattern is advantageous in applications wherein there is a directionally oriented gas flow across the surface of the article, and the surface texture pattern is oriented relative to that directionally oriented gas flow. The gas flow may be, for example, air or combustion gas.

In accordance with the invention, a method for preparing a surface comprises the steps of providing an article having an article surface, thereafter first processing the article surface to establish a first residual compressive stress state and a first surface roughness in the article surface, and thereafter second processing the article surface by surface compressive texturing to establish a second residual compressive stress state and a second surface roughness in the article surface. The second surface roughness is quantitatively less than the first surface roughness. Substantially no material is removed from the article surface in the second processing step. The second processing step is different from the first processing step.

In an application of particular interest, the article is a component of a gas turbine engine. The article surface may be contacted by a directionally oriented gas flow when the article is in service. Examples of articles with which the present approach may be used include an airfoil such as a turbine or compressor blade airfoil; a turbine or compressor vane airfoil; the web of a turbine, compressor, or fan disk; a joint in which contacting elements are intended to move with respect to each other in a particular way; a gear tooth; a contact point where the contacting surfaces are not intended to move with respect to each other, such as a face between a dovetail on a blade and the blade slot on a disk; and other types of structure.

The second processing step may include a step of establishing a directionally oriented surface texture pattern of surface asperities in the article surface. The directionally oriented surface texture pattern may be nonlinear; that is, the surface texture pattern may be curved or angular across the article surface to track a desirable pattern associated with the service application of the article.

Thus, in the situation where the article surface is contacted by a directionally oriented gas flow when the article is in service to define a gas flow impingement direction on the article surface, the second processing step may be used to establish a directionally oriented surface texture pattern of surface asperities in the article surface, particularly where the article surface is nonplanar (i.e., curved in one or two dimensions). The directionally oriented surface texture pattern of surface asperities bears a selected relation to the gas flow impingement direction. In the case of an airfoil, this surface texture pattern is selected to optimize the performance of the airfoil.

The processing may be accomplished by peening the article surface to establish a first residual compressive stress state and a first surface roughness in the article surface, and thereafter burnishing the article surface by surface compressive texturing, using deep or shallow rolling or other burnishing technique. The final result is the second residual compressive stress state and the second surface roughness in the article surface. Other compatible features discussed herein may be used with the steps of surface peening and burnishing.

The article surface produced by the present approach has a compressive residual stress state that resists the onset and propagation of fatigue cracks during service of the article. This compressive stress state is initially created in the first processing step. However, the first processing step typically leaves the article surface in a roughened state, which may interfere with its functionality during service.

The second processing step does not lessen the residual compressive stress state produced in the first processing step, but instead maintains and even increases the surface compressive stress state. Significantly, the second processing step does not utilize processing in which material is removed from the article surface. Such removal of material in the second processing step would tend to negate the residual compressive stress state produced in the first processing step by removing some of the thickness of material that is in the residual compressive stress state at the completion of the first processing step. Instead, the second processing step reduces the magnitude of the surface roughness that results from the first processing step, without removing any of the material that is in the residual compressive stress state. The second processing step actually increases the residual compressive stress state by working the surface without removing material. The second processing step must be performed after the first processing step, because the resulting final surface would be too rough if the second processing step were performed before the first processing step.

The present approach is particularly advantageously applied where the surface finish of the article is a consideration in its service application. In an example of particular interest, the airfoil of a curved gas turbine compressor blade or compressor vane is contacted by a directionally oriented high-velocity flow of gas in service. The pressure side of the airfoil is subjected to both high-frequency and low-frequency fatigue. The pressure-side surface of the airfoil is therefore desirably in a residual compressive stress state. However, if the airfoil is mechanically processed to create a residual compressive stress state, the associated roughening of the surface interferes with the smooth gas flow across the pressure-side airfoil surface. The present approach includes the second processing, following the first processing step, to reduce the surface roughness, and even to shape the remaining surface roughness so as to be compatible with the directionally oriented gas flow across the airfoil surface.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
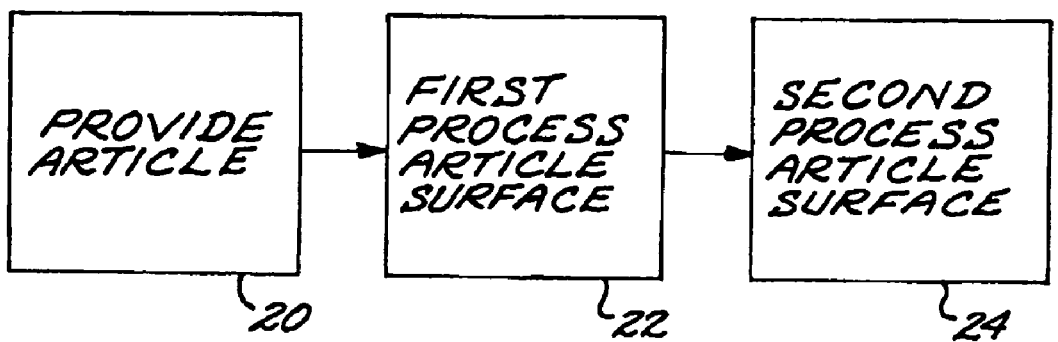
FIG. 1 is a block flow diagram of a method for preparing a surface.
Figure 2:
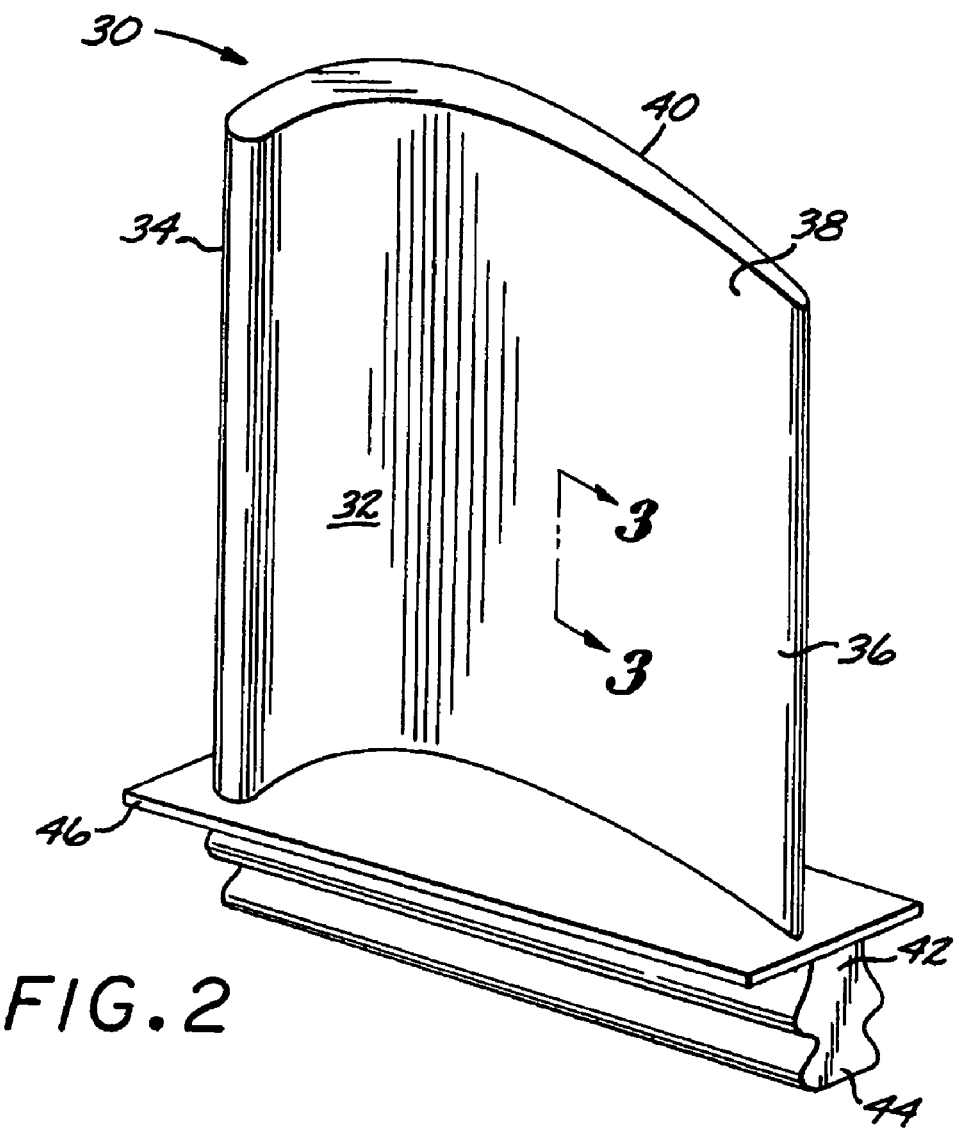
FIG. 2 is a perspective view of a gas turbine blade.

FIG. 1 illustrates a method for preparing a surface, and FIG. 2 depicts an article 30 of the most current interest. The article 30 having an article surface 32 is provided, step 20. In the illustrated embodiment, the article 30 is a gas turbine blade 34. (That is, the article 30 generically is a blade used in a gas turbine engine, but not necessarily in the turbine section. The article 30 may, for example be a compressor blade of the gas turbine engine.) The gas turbine blade 34 has an airfoil 36 including a pressure side 38, against which a flow of gas impinges during service operation, and an oppositely disposed suction side 40. The gas turbine blade 34 further includes a downwardly extending shank 42, and an integral attachment in the form of a dovetail 44, which attaches the gas turbine blade 34 to a gas turbine disk (not shown) of the gas turbine engine. A platform 46 extends transversely outwardly at a location between the airfoil 36 and the shank 42 and dovetail 44.

The article 30 may be made of any operable material. Examples include nickel-base alloys such as nickel-base superalloys strengthened by the precipitation of gamma-prime or a related phase, cobalt-base alloys, and titanium-base alloys. The article made of such materials may be provided in cast, cast-and-worked, or powder-metallurgy forms.

Figure 3:
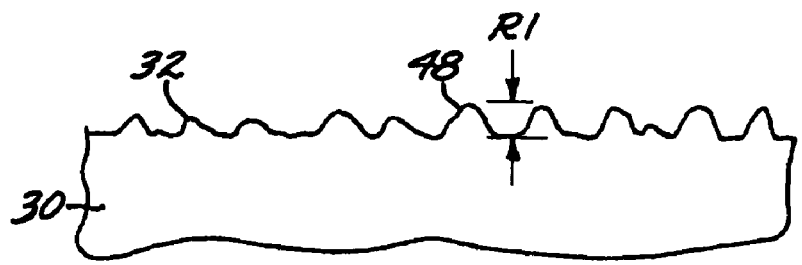
FIG. 3 is an enlarged sectional-view detail of the surface of the gas turbine blade of FIG. 2, taken on line 3-3, after first processing but before second processing.
Figure 4:
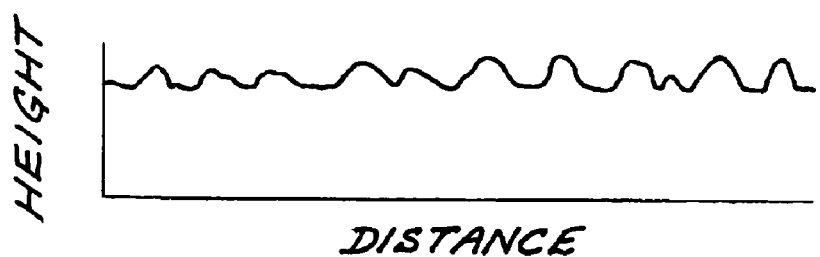
FIG. 4 is a schematic surface roughness profile of the surface of the gas turbine blade of FIG. 3.

The article surface 32 is thereafter first processed to establish a first residual compressive stress state and a first surface roughness in the article surface 32, step 22. The first processing 22 may be performed by any operable method, but peening is preferred. In peening, the article surface 32 is deformed by mechanical impacts of small physical objects, as for example in glass bead peening, metal shot peening, or ultrasonic shock peening, or by impacts of shock waves, as for example in laser shock peening. Other operable techniques such as low-plasticity burnishing may be used. The peening plastically deforms the article surface 32 to have a surface profile like that illustrated in FIGS. 3 and 4. The surface profile of the article surface 32 has a measurable surface roughness, which may be measured in any operable way. In the illustration, the surface roughness R1 is measured as the maximum difference between the highest peak and the lowest valley on the article surface 32 (excluding occasional anomalous features such as deep scratches and the like).

The plastic deformation of the article surface 32 leaves the article surface in a first residual compressive stress state that is beneficial to reducing the susceptibility of the article 30 to fatigue damage in service. Because fatigue cracks often start at the free article surface 32, placing the article surface 32 into the first residual compressive state reduces the likelihood that a fatigue crack will start at the article surface 32 and propagate into the article 30 from the article surface 32. Similarly, the surface compressive stress state protects against the initiation and propagation of cracks resulting from foreign object damage (FOD) and minor handling damage.

However, the surface roughness R1 of the relatively rough surface finish is sufficiently great that it may interfere with the smooth directionally oriented gas flow across the article surface 32, particularly where the article surface 32 is the pressure side 38 of the airfoil 36 that is intentionally subjected to a high-velocity directionally oriented gas flow impingement in service. The rippled article surface 32 of surface roughness R1 can introduce gas flow perturbations into the gas flow, which interfere with the aerodynamic performance of the airfoil 36. Similar disruptions may occur in other components of the gas turbine engine over which gas rapidly flows in service, or components of other types of apparatus. Such interference with the smooth gas flow may lead to flow separation. The greater the surface roughness of the article surface 32, the greater is the risk of flow separation of the high-velocity directionally oriented gas flow that impinges on the article surface in service.

Figure 5:
FIG. 5 is an enlarged sectional-view detail of the surface of the gas turbine blade of FIG. 2, taken on lines 3-3, after second processing.
Figure 6:
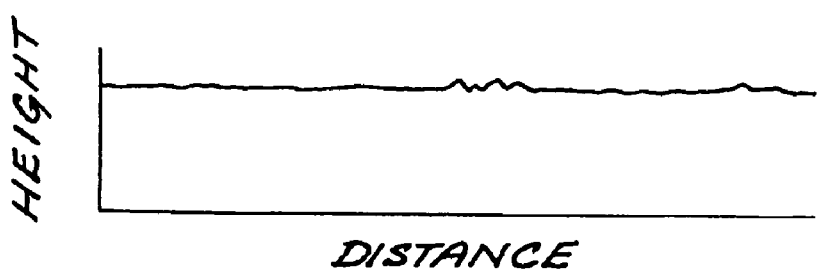
FIG. 6 is a schematic surface roughness profile of the surface of the gas turbine blade of FIG. 5.

Consequently, the article surface 32 is thereafter second processed, step 24, by surface compressive texturing to establish a second residual compressive stress state and a second surface roughness R2 in the article surface. The procedure used in the second processing step 24 must be different from the procedure used in the first processing step 22. FIGS. 5 and 6 illustrate the article surface 32 after the step of second processing 24. The second surface roughness R2 is quantitatively less than the first surface roughness R1. As a result, the in-service directionally oriented gas flow over the article surface 32 suffers much less disruption than it would experience if it had the first surface roughness R 1.

Substantially no material is removed from the article surface in the step of second processing 24. By "substantially" is meant that no material is intentionally removed. There may be some minor, incidental removal of material from the article surface 32, as for example by adherence of very small amounts of material from the article surface 32 to the apparatus used to perform the second processing step 24. Reducing the surface roughness without removing material is a key requirement and advantage of the present approach. The surface material that would otherwise be removed is the material, which is in the beneficial residual compressive stress state. If a sufficiently great amount of material were removed in the step of second processing 24, there might be little or none of the material left that was in the first residual stress state after the step of first processing 22.

The step of second processing 24 is preferably accomplished by roller burnishing the article surface 32, and most preferably by deep roller burnishing the article surface. In deep roller burnishing, a cylindrical, tapered, or spherical roller element rolls over the article surface 32, reducing the heights of the surface asperities 48 (i.e., bumps or ridges) and introducing additional residual compressive stresses in the article surface 32. Substantially no material is removed from the article surface 32, as required for the step of second processing 24 of the present approach. Operable roller burnishing processes are described in U.S. Pat. Nos. 4,947,668 and 4,922,739, whose disclosures are incorporated by reference.

In deep roller burnishing, the burnishing roller is passed over the article surface in a series of passes, with each pass displaced laterally from the preceding pass. The desirable overlap between passes is established by several considerations, including the diameter and width of the burnishing roller, the pressure applied to the burnishing roller, and the material of the article 30. The smaller the actual overlap, the rougher is the resulting article surface 32. The greater the actual overlap, the finer is the resulting article surface 32 and the higher are the residual stresses in the article 30 just below the article surface 32. For some applications, the overlap is desirably at least 50 percent.

Many widely used surface-processing techniques cannot be used for the step of second processing 24, because they intentionally remove material using abrasives or other material-removal media. For example, grinding, machining, grit blasting, tumbling, mechanical polishing, chemical polishing, and electrochemical polishing are not suitable for use in the second processing step 32, because each of these techniques intentionally removes material.

The step of second processing 24 may optionally be used to establish a directionally oriented surface texture pattern of the surface asperities 48 in the article surface 32. ("Texture" as used herein refers to a directional orientation of surface asperities, not to crystallographic texture.) The step of first processing 22 produces the surface texture of surface asperities 48 that is largely without directional orientation in the plane of the article surface 32. The step of second processing 24 may be used to orient the surface asperities 48 parallel to a particular selected direction lying in the article surface 32. In the case of using burnishing in the second processing step 24, the orienting is achieved by only rolling the burnishing wheels or rollers against the article surface 32 parallel to the selected direction that lies in the article surface 32. The burnishing wheels or rollers are not rolled in a cross rolling direction that is not parallel to the selected direction. Such orienting of the surface asperities 48 is useful where there is a flow of gas impinging upon the article surface 32 in service, and it is desired that the surface asperities 48 (after the step of second processing 24) have a selected orientation relative to the direction of impingement.

Figure 7:
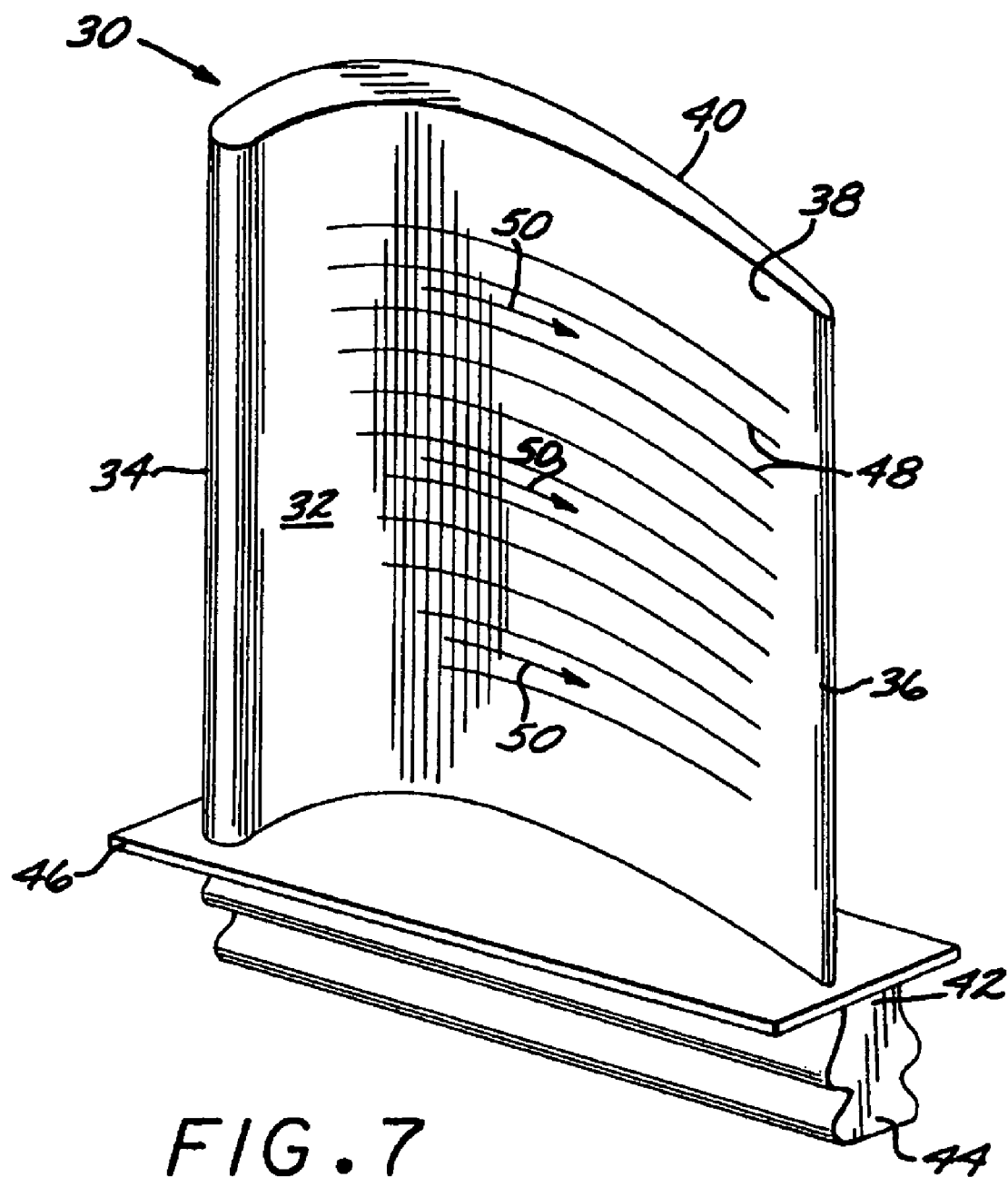
FIG. 7 is a perspective view of a gas turbine blade like that of FIG. 2, but with a directionally oriented surface texture pattern indicated on the surface.

In the example of FIG. 7, gas impingement direction arrows 50 are a vector indication of impingement of the directionally oriented gas flow against the airfoil 36 of the gas turbine blade 34 when the gas turbine blade 34 is in service. The benefits of reducing the roughness of the surface asperities 48 to R2 can be further enhanced by aligning the surface asperities 48 generally parallel to (or with some other selected directional relationship to) the gas impingement direction arrows 50, as indicated in FIG. 7, rather than crossways to the gas impingement direction arrows 50. The interruption of the smooth flow of the high-velocity directionally oriented gas flow over the article surface 32 of the airfoil 36 of the gas turbine blade 34 is lessened by this directional orientation of the surface texture pattern of the asperities 48. The shape of the directional orientation of the surface texture pattern of the asperities 48 may be linear or, as shown in FIG. 7, nonlinear to follow the shape of the article surface 32 and the gas-impingement direction 50.

The second processing step 24 must follow the first processing step 22. The order of the steps cannot be reversed such that the step of first processing 22 follows the step of second processing 24. If the steps were reversed, with the procedures of the step of first processing 22 following the procedures of the step of second processing 24, the result would be that the final article surface is unacceptably rough. For those embodiments in which a directionally oriented surface texture pattern of the surface asperities 48 is produced in the step of second processing 24, such a directionally oriented surface texture pattern would be lost if the procedures of the first processing step 22 were to be used on the article surface after the second processing step 24.

The advantages of the present approach may be realized with a wide variety of articles 30. Particularly advantageous results are achieved with articles subjected to a directionally oriented gas flow across their surfaces when in service, such as airfoils, and structures operating in a high-velocity gas flow, such as the web of a turbine disk.

The present approach was tested on a curved airfoil surface. The surface was first tumbled and then peened with glass beads. A first portion of the airfoil surface was thereafter roller burnished in a single roller direction, and a second portion of the airfoil surface was left in the as-peened state. Five surface roughness measurements were made in each portion. The average surface roughness Ra of the first (unidirectionally burnished) portion was 5.0 microinches measured perpendicular to the burnishing direction and 2.9 microinches measured parallel to the burnishing direction. The average surface roughness Ra of the second (un-burnished) portion was 15.5 microinches measured perpendicular to the burnishing direction and 14.4 microinches measured parallel to the burnishing direction, values judged to be essentially the same within normal experimental variations. Thus, unidirectional burnishing following tumbling and peening resulted in significant improvement of the surface roughness both parallel to and perpendicular to the burnishing direction, but the smallest surface roughness (i.e. smoothest surface) was achieved parallel to the burnishing direction. Orienting the burnishing direction to be parallel to the projection of the directionally oriented gas flow direction onto the curved surface is expected to achieve the smallest surface roughness for the impinging directionally oriented gas flow resulting in more efficient gas flow.

Although a particular embodiment of the invention has been described in detail for purposes of illustration, various modifications and enhancements may be made without departing from the spirit and scope of the invention. Accordingly, the Invention is not to be limited except as by the appended claims.

What is claimed is:

1. A method for preparing a surface, comprising the steps of
    providing an article having an article surface; thereafter
    first processing the article surface to establish a first residual compressive stress state and a first surface roughness in the article surface; and thereafter
    second processing the article surface by surface compressive texturing to establish a second residual compressive stress state and a second surface roughness in the article surface, wherein the second surface roughness is quantitatively less than the first surface roughness, wherein substantially no material is removed from the article surface in the step of second processing, and wherein the second processing is different from the first processing,
    wherein the step of second processing the article surface includes establishing a selected directionally oriented surface texture pattern of surface asperities in the article surface, wherein the directionally oriented surface texture pattern of surface asperities are aligned generally parallel with the direction of gas flow impinging upon the article surface when the article is in service.

2. The method of claim 1, wherein the step of providing an article includes the step of providing the article as a component of a gas turbine engine.

3. The method of claim 1, wherein the step of providing an article includes the step of providing the article having the article surface that is contacted by a directionally oriented gas flow when the article is in service.

4. The method of claim 1, wherein the step of first processing includes the step of first processing the article surface by peening.

5. The method of claim 1, wherein the step of second processing includes the step of deep roller burnishing the article surface.

6. The method of claim 1, wherein the step of second processing includes the step of establishing a nonlinear directionally oriented surface texture pattern of surface asperities in the article surface.

7. The method of claim 1, wherein the step of providing an article includes the step of providing the article having the article surface that is contacted by a directionally oriented gas flow when the article is in service to define the gas flow impingement direction on the article surface.

8. The method of claim 1, wherein the step of providing an article includes the step of providing the article having an article airfoil surface that is contacted by a directionally oriented gas flow when the article is in service to define the gas flow impingement direction on the article surface.

9. A method for preparing a surface, comprising the steps of
    providing an article having an article surface that is contacted by a directionally oriented gas flow when the article is in service to define a gas flow impingement direction on the article surface; thereafter
    peening the article surface to establish a first residual compressive stress state and a first surface roughness in the article surface; and thereafter
    burnishing the article surface by surface compressive texturing to establish a second residual compressive stress state and a second surface roughness in the article surface, wherein the second surface roughness is quantitatively less than the first surface roughness, and wherein substantially no material is removed from the article surface in the step of burnishing,
    wherein the step of burnishing includes the step of establishing a directionally oriented surface texture pattern of surface asperities in the article surface, wherein the directionally oriented surface texture pattern of surface asperities are aligned generally parallel with the direction of gas flow impinging upon the article surface when the article is in service.

10. The method of claim 9, wherein the step of providing the article includes the step of providing the article as a component of a gas turbine engine.

11. The method of claim 9, wherein the step of burnishing includes the step of deep roller burnishing the article surface.

12. The method of claim 9, wherein the step of providing the article includes the step of providing the article having the article surface that is contacted by the directionally oriented gas flow when the article is in service.

13. The method of claim 9, wherein the step of providing an article includes the step of providing the article having an article airfoil surface that is contacted by a directionally oriented gas flow when the article is in service to define a gas flow impingement direction on the article surface.

* * * * *